United States Patent
Koma

[11] Patent Number: 5,483,591
[45] Date of Patent: Jan. 9, 1996

[54] APPARATUS FOR REFERRING TO A CONTENT OF A DIAL MEMORY IN A TELPHONE SET

[75] Inventor: Noriko Koma, Tokyo, Japan

[73] Assignee: NEC Corportion, Tokyo, Japan

[21] Appl. No.: 190,000

[22] Filed: Feb. 1, 1994

Related U.S. Application Data

[63] Continuation of Ser. No. 535,622, Jun. 11, 1990, abandoned.

[30] Foreign Application Priority Data

Jun. 9, 1989 [JP] Japan ..................... 1-146959
Jan. 24, 1990 [JP] Japan ..................... 2-14356

[51] Int. Cl.6 .................................... H04M 1/27
[52] U.S. Cl. ................. 379/356; 379/354; 379/355; 379/357; 379/216
[58] Field of Search .................. 379/354, 355, 379/216, 356, 357

[56] References Cited

U.S. PATENT DOCUMENTS

| | | |
|---|---|---|
| 1,966,005 | 1/1978 | Gillette . |
| 4,409,440 | 10/1983 | Brodbeck ..................... 379/357 |
| 4,633,041 | 12/1986 | Boivie et al. ................. 379/354 |
| 4,800,582 | 1/1989 | D'Agosto, III et al. ........ 379/354 |
| 4,862,498 | 8/1989 | Reed ........................... 379/354 |
| 4,908,853 | 3/1990 | Matsumoto ................... 379/354 |
| 5,007,081 | 4/1991 | Schmuckal et al. ........... 379/354 |
| 5,136,637 | 8/1992 | Rust et al. .................... 379/355 |

FOREIGN PATENT DOCUMENTS

| | | |
|---|---|---|
| 0268739 | 7/1987 | European Pat. Off. . |
| 2494063 | 4/1982 | France . |
| 3410579 | 9/1985 | Germany . |
| 61-071753 | 4/1986 | Japan . |
| 62-214425 | 9/1987 | Japan . |
| 62-272644 | 11/1987 | Japan . |
| 84002440 | 6/1984 | WIPO . |

Primary Examiner—Jeffery A. Hofsass
Assistant Examiner—Jacques M. Saint-Surin
Attorney, Agent, or Firm—Sughrue, Mion, Zinn, Macpeak & Seas

[57] ABSTRACT

Index letters representing different groups of dial memories are stored in an index letter memory. One of the dial memories is displayed on a display to be a starting memory, when a reference requesting signal is supplied from a key input unit to a whole memory or skip reference portion of a central processing unit, so that a whole memory or skip reference mode is carried out to refer to a dial memory indexed in each of the different groups by each of the index letters in a forward or reverse direction from the starting memory to following dial memories. In the whole memory reference mode, dial memories indexed by the index letters are referred for continuous groups of dial memories. In the skip reference mode, index letters of a number "n" are skipped in accordance with the pressing-on of a skip reference key provided in the key input unit by "n" times, so that a dial memory corresponding to an index letter following the skipped index letters is referred to be displayed on the display.

5 Claims, 5 Drawing Sheets

APPARATUS FOR REFERRING TO A CONTENT OF A DIAL MEMORY IN A TELPHONE SET

This is a continuation of application Ser. No. 07/535,622 filed Jun. 11, 1990, now abandoned.

FIELD OF THE INVENTION

This invention relates to an apparatus for referring to a content of a dial memory in a telephone set, and more particularly to, an apparatus for referring in turn to contents of a dial memory group one by one. Each dial memory of which stores a telephone number, a name corresponding thereto, etc. in a telephone set having a display for displaying the memory content.

BACKGROUND OF THE INVENTION

A conventional apparatus for referring to a content of a dial memory in a telephone set comprises a dial memory group, each dial memory storing subscriber's data such as a telephone number, a name corresponding to the telephone number, etc., a key input unit for generating a reference signal for referring to the content of the dial memory, and a CPU including a whole memory reference means for referring in turn to the contents of the dial memory group in accordance with the reference signal supplied from the key input unit.

In operation, it is assumed that a forward direction reference key is pressed by an operator, so that a reference signal for the instruction of referring in the forward direction to the contents of the dial memory group is supplied from the key input unit to the CPU. As a result, a content of a starting dial memory is referred to and displayed on a display by the whole memory reference means. When the forward direction reference key is again pressed by the operator for the second time, a content of a dial memory which is positioned next in alphabetical order to the starting dial memory is referred to be displayed on the display by the whole memory reference means. In this manner, the dial memory group is referred in the forward direction as a result of pressing the forward direction reference key a predetermined number of times, until a dial memory storing a telephone number of a person that the operator wants to know is referred to and displayed on the display. Consequently, a predetermined telephone number is obtained for the operator. If a reverse direction reference key is pressed on by the operator, the dial memory group is referred in the reverse direction of the alphabetical order, until a predetermined telephone number is displayed on the display.

However, the conventional apparatus for referring to a content of a dial memory in a telephone set has a disadvantage in that it takes a long time to obtain the predetermined telephone number, because the whole contents of the dial memory group are referred in the forward or reverse direction of the alphabetical order as instructed by the operator until the predetermined telephone number is displayed. As the number of telephone numbers which are stored in the dial memory group increases the time in which the predetermined telephone number is referred is further increased.

SUMMARY OF THE INVENTION

Accordingly, it is an object of this invention is to provide an apparatus for referring to a content of a dial memory in a telephone set in which a time necessary for referring to a dial memory storing a predetermined telephone number is shortened.

According to this invention, an apparatus for referring to a content of a dial memory in a telephone set, comprises:

a dial memory group including a plurality of dial memories, each of said dial memories storing a telephone number and letter data corresponding to the telephone number, and being arranged in a predetermined order according to a content of the telephone number and the letter data;

an index letter memory for storing index letters, each corresponding to the content of each dial memory;

means for referring to the dial memory group; and a display for displaying a content of a dial memory which is referred among the dial memories by the means;

wherein the means refers to the index letters of the index letter memory in a forward or reverse direction of the predetermined order to select a predetermined index letter corresponding to a predetermined dial memory storing a usable content, and refers in turn to a group of dial memories in a condition that a dial memory storing the predetermined index letter as a part of the content is a starting memory, thereby displaying the predetermined dial memory on the display.

BRIEF DESCRIPTION OF THE DRAWINGS

This invention will be described in more detail in conjunction with appended drawings, wherein.

DESCRIPTION OF THE PREFERRED EMBODIMENTS

Figure 1:
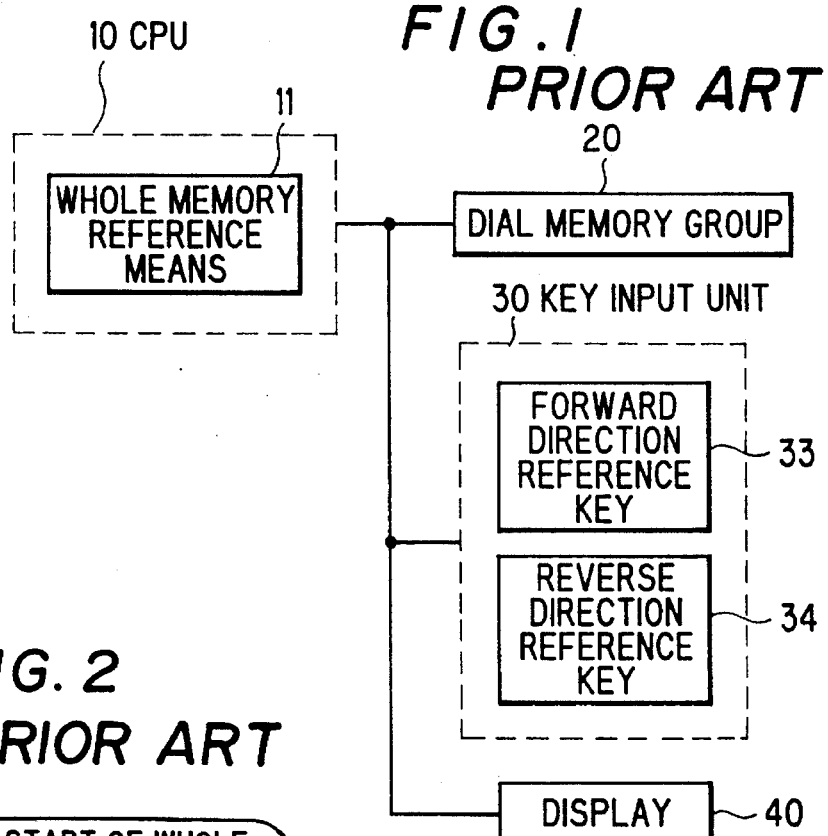
FIG. 1 is a block diagram showing a conventional apparatus for referring to a content of a dial memory in a telephone set.

Before explaining an apparatus for referring to a content of a dial memory in a telephone set according to the invention, the aforementioned conventional apparatus for referring to a content of a dial memory in a telephone set will be explained in FIG. 1, wherein it comprises a CPU 10 including a whole memory reference means 11, a dial memory group 20, in which each dial memory stores a telephone number and a name, etc., and is referred by the whole memory reference means 11, a key input unit 30 including a forward direction reference key 33 and a reverse direction reference key 34, and a display 40 for displaying a content of a dial memory.

Figure 2:
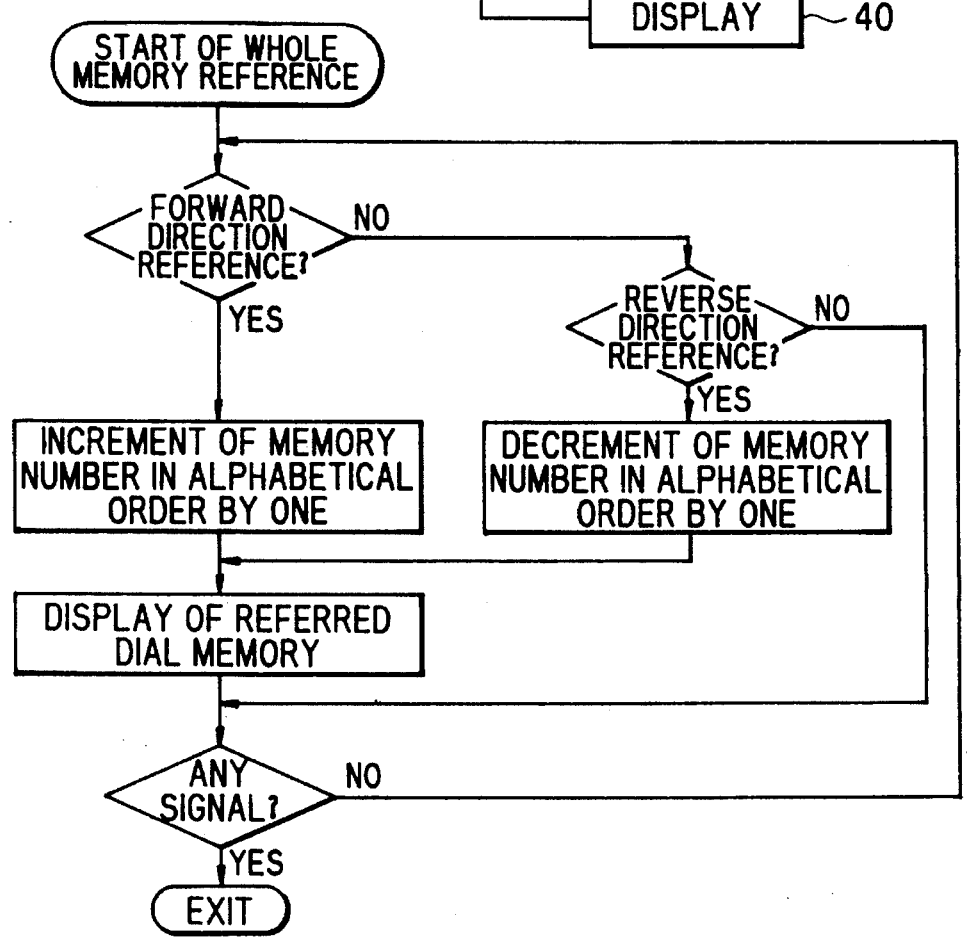
FIG. 2 is a flow chart explaining operation in the conventional apparatus shown in FIG. 1.

Operation will be explained in FIG. 2. When the forward direction reference key 33 is pressed by an operator, an instruction signal is supplied from the key input unit 30 to the CPU 10, so that a dial memory of the dial memory group 20 having a memory number larger than a starting memory by one is referred by the whole memory reference means 11, wherein the starting memory is a dial memory which is displayed on the display 40 at the time of generating the instruction signal. Consequently, a content of the referred dial memory is displayed on the display 40. When the forward direction reference key 33 is pressed on for the second time, a dial memory of the dial memory group 20 which is next in the forward direction of the alphabetical order to the preceding referred dial memory is referred to and displayed on the display 40 by the whole memory reference means 11. Thus, the whole dial memories of the dial memory group 20 are referred to and displayed on the display 40 in the forward direction of the alphabetical order one by one at each time, when the forward direction reference key 33 is pressed, until a dial memory storing a telephone number, a name, etc. that the operator wants to know is finally referred to be displayed on the display 40.

On the other hand, when the reverse direction reference key 34 is pressed by the operator, the dial memory group 20 is referred in turn to be displayed on the display 40 in the reverse direction of the alphabetical order one by one, in the same manner as described in the forward direction reference. Therefore, the aforementioned disadvantage in that a long time is required in the conventional apparatus.

Next, an apparatus for referring to a content of a dial memory in a telephone set in the preferred embodiment according to the invention will be explained in FIG. 3, wherein like parts are indicated by like reference numerals as used in FIG. 1, except that an index letter memory 50 is further provided to store index letters, each of which is of an initial letter common to data stored in a group of plural dial memories, in alphabetical order, and a program for controlling operation in this preferred embodiment, and that the CPU 10 further includes a skip reference means 12 for skipping the reference of a predetermined number of index letters and then referring to index letters following the skipped index letters, and the key input unit 30 further includes a whole memory reference key 31 for driving the whole memory reference means 11, and a skip reference key 32 for driving the skip reference means 12. The skip reference means 12 refers to the dial memory group 20 in the skipped reference mode in a condition that a starting memory is a dial memory which is displayed at a time of generating a reference instruction signal supplied from the skip reference key 32 of the key input unit 30, such that dial memories, each of which represents the group corresponding to one of index letters to be skipped dependent on the number of times the skip reference key 32 is pressed, are not referred, but a predetermined number of dial memory groups indexed by index letters following the skipped index letters are referred in the forward or reverse direction of the alphabetical order. In this preferred embodiment, the index letter memory 50 is of an electrically erasable/programmable read-only memory (EEPROM), and the dial memory group 20 is of an electrically programmable read-only memory (EPROM).

Figure 3:
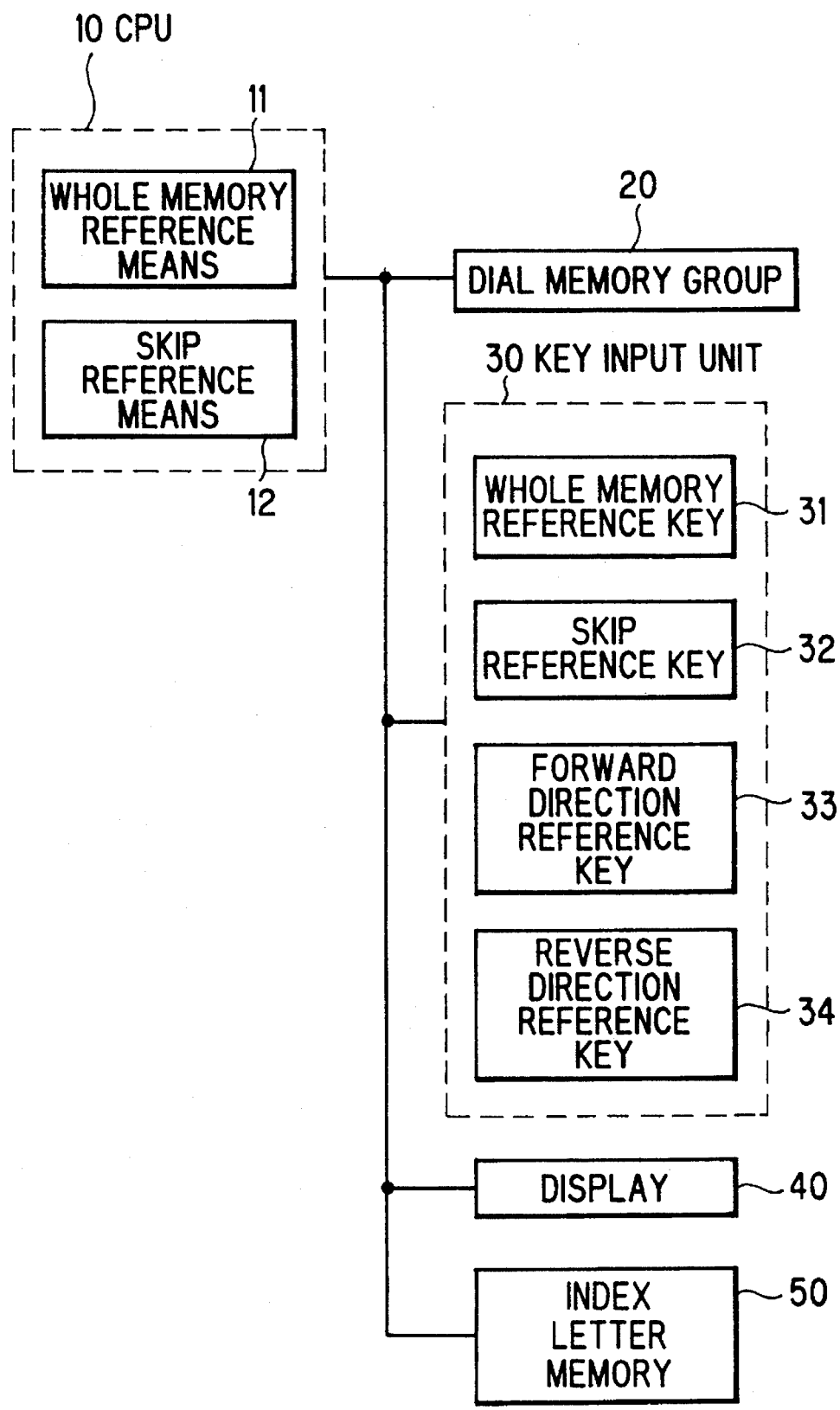
FIG. 3 is a block diagram showing an apparatus for referring to a content of a dial memory in a telephone set in a preferred embodiment according to the invention.
Figure 4:
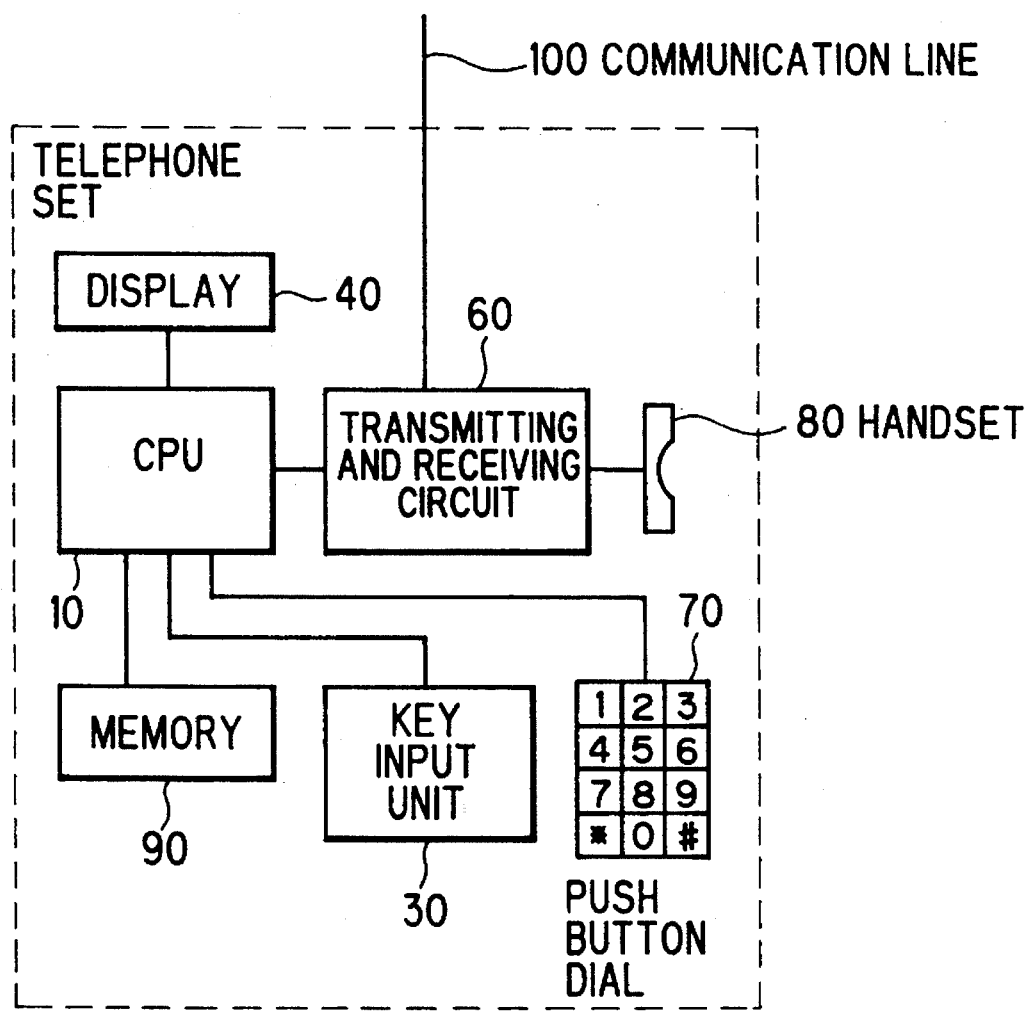
FIG. 4 is a block diagram showing a telephone set having a dial memory display included in the apparatus in FIG. 3.

The apparatus for referring to a content of a dial memory shown in FIG. 3 is included in a telephone set as shown in FIG. 4, wherein like parts are indicated by like reference numerals as used in FIG. 3, except that a transmitting and receiving circuit 60 which is connected to a communication line 100 and to a handset 80 is connected to the CPU 10, along with a push-button dial 70, and the dial memory group 20 and the index letter memory 50 are indicated as a memory 90. The transmitting and receiving circuit 60 may transmit and receive signals over radio communication path in place of the line 100.

Figure 5:
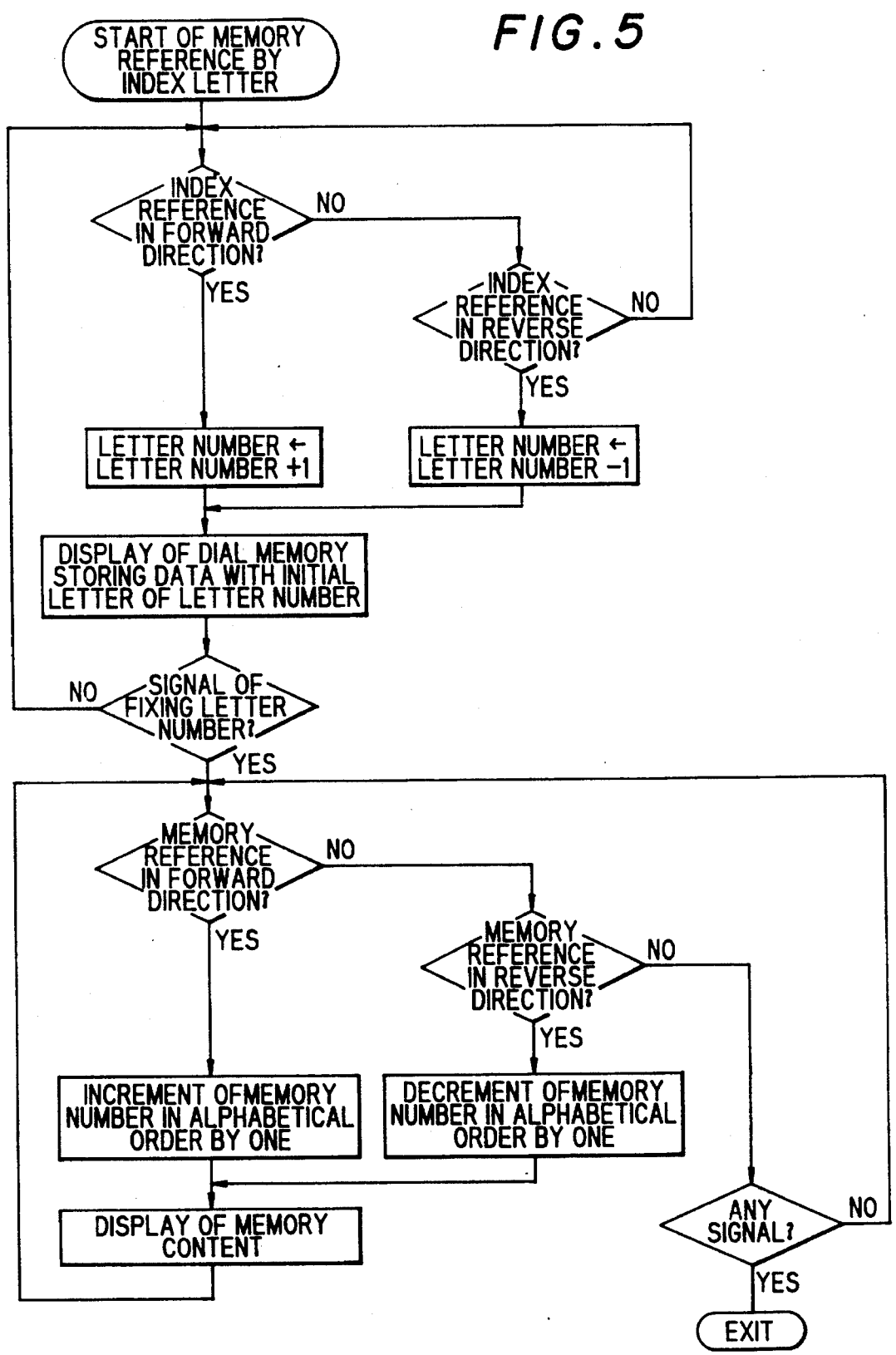
FIG. 5 is a flow chart explaining a first operation in the apparatus according to the invention.

In this preferred embodiment, the first operation will be explained with reference to FIG. 5.

When the forward direction reference key 33 is pressed a number for predetermined times by the operator, an instruction signal is supplied from the key input unit 30 to the CPU 10, so that index letters each having a letter number larger than a preceding letter number by one are read in turn from the index letter memory 50 one by one. When an index letter which is now displayed on the display 40 corresponds to one for a dial memory in which a telephone number, a name, etc. that the operator wants to know are stored, the displayed index letter is fixed on the display 40 by pressing a fixing key (not shown) of the key input unit 30. Then, when the forward direction reference key 33 is pressed on for predetermined times by the operator, contents of dial memories all corresponding to the fixed index letter and each having a memory number larger than a preceding memory number by one are read in turn from the dial memory group 20 to be displayed on the display 40 one by one, wherein a first memory is a dial memory storing the fixed index letter as a part of data, until the dial memory having a telephone number, a name, etc. that the operator wants to know is finally displayed on the display 40.

On the other hand, when the reverse direction reference key 34 is pressed in the same manner as in the forward direction reference key 33, index letters each having a letter number less than a preceding letter number by one are displayed on the display 40, and, when a displayed index letter is fixed, contents of dial memories are displayed in the reverse direction of the alphabetical order in the same manner as in the forward direction reference, until predetermined telephone number arid name, etc. are displayed on the display 40.

As explained above, index letters (a row of letters) are first referred to decide an index letter corresponding to dial memories, among which a predetermined dial memory is included, and the dial memories are then referred to in accordance with a predetermined displaying order. Consequently, a time, after which the predetermined dial memory is displayed, is shortened, and the number of manual key operation times is decreased, so that the predetermined dial memory can easily and promptly be accessed even in a telephone set having dial memories of a remarkably large number.

Figure 6:
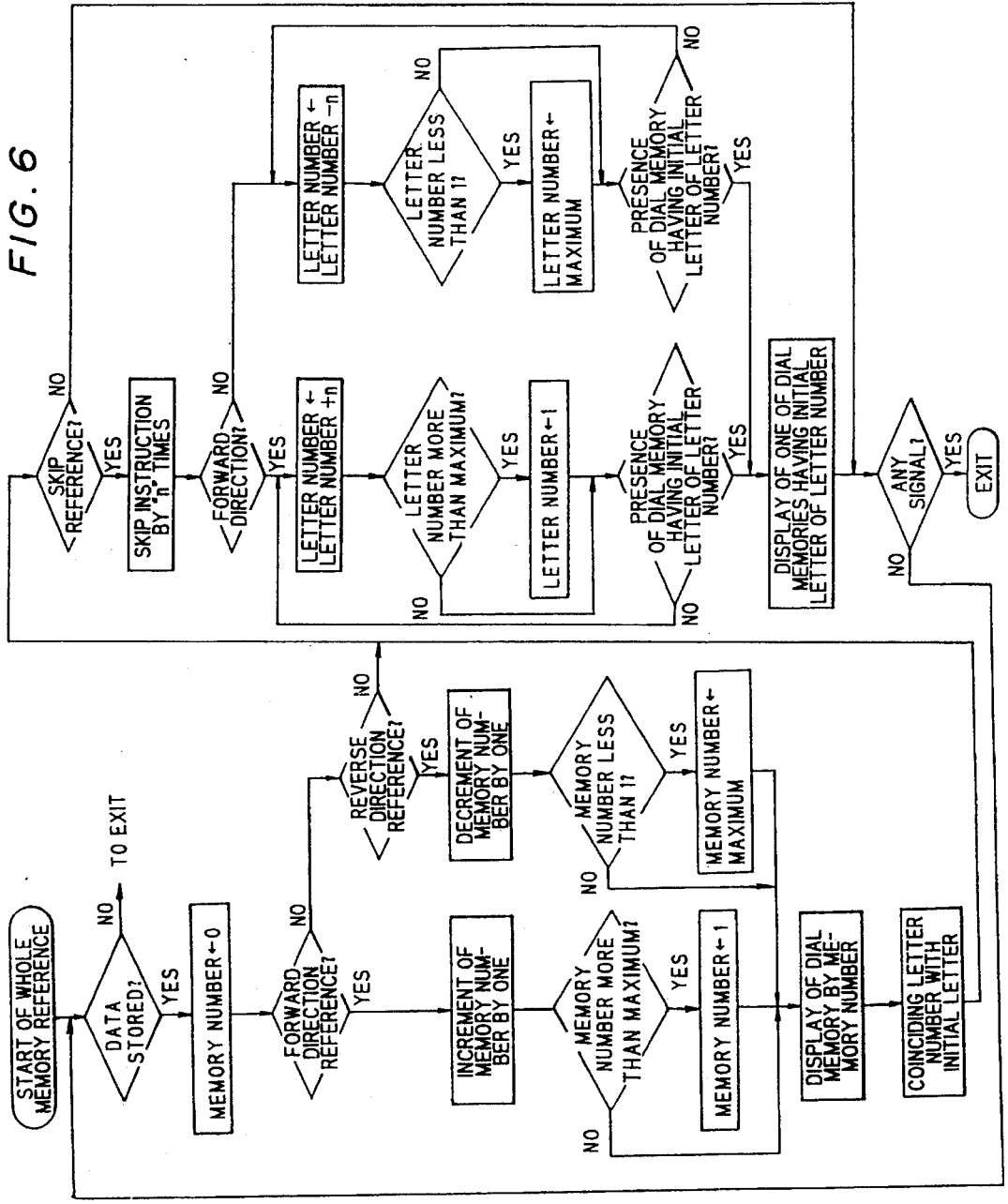
FIG. 6 is a flow chart explaining a second operation in the apparatus according to the invention.

Next, the second operation will be explained in FIG. 6.

When a whole; memory reference mode starts, it is checked whether data are stored in the dial memory group or not. Where data are stored therein, a memory number is set to be "0" in the initial condition. In this circumstance, when a signal of requesting a memory reference in the forward direction is supplied from the forward direction reference key 33 of the key input unit 30 to the CPU 10, dial memories are in turn referred one by one in accordance with the increment of a memory number by one. On the other hand, when a signal of requesting a memory reference in the reverse direction is supplied from the reverse direction reference key 34 of the key input unit 30 to the CPU 10, a content of a dial memory is displayed on the display 40 in accordance with the decrement of the memory number by one. In the forward direction reference, when a memory number becomes more than the maximum memory number, the memory number is returned to "1". In the reverse direction reference, on the other hand, when a memory number becomes less than "1", the memory number is set to be the maximum number. Under these circumstances, the letter number is coincided with an initial letter of data stored in the displayed dial memory, when there is no coincidence therebetween.

Otherwise, when a signal of requesting a skip reference is supplied from the skip reference key 32 of the key input unit 30 to the CPU 10 in a state that the forward memory reference is carried out, the letter number is incremented by a number "n", where "n" is the number of manual operation times by which the skip reference key 32 is pressed on, until dial memories each storing data with an initial letter corresponding to the letter number are found. Then, one of the dial memories corresponding to the incremented letter number is displayed on the display 40. This means that index letters of "n" are skipped. When a letter number becomes more than the maximum letter number, the letter number is returned to "1". When one of the letter numbers is designated by the operator, the memory number is incremented in the dial memories corresponding to the designated letter number one by one, until a content of the predetermined dial memory is displayed on the display 40. Under this circumstance, any other signal is received by the CPU 10, the skip reference mode is finished, and another reference mode starts. As a matter of course, when the skip reference requesting signal is supplied to the CPU 10 in a state that the reverse memory reference is carried out, the letter number is decremented by the number "n", and one of the dial memories corresponding to the decremented letter number is displayed on the display 40 in the same manner as in the forward direction reference.

As described above, there is provided two dial memory reference modes, wherein the first mode is that, when a request of the skip reference is generated, contents of dial memories, each of which represents each group of dial memories indexed by each index letter, are in turn displayed to decide a predetermined index letter for indexing a predetermined group of dial memories by the forward or reverse direction reference of index letters, so that a dial memory storing a telephone number, a name corresponding to the telephone number, etc. that the operator wants to know can be displayed by referring to the selected group of dial memories, and the second mode is a conventional reference mode, in which a whole of dial memories are referred in the forward or reverse direction, such that a starting memory is a dial memory which is displayed at the starting time of this reference operation. In this preferred embodiment, one of these two reference modes can be selected to shorten a time for referring to a predetermined dial memory, and decrease the key operation times for displaying the predetermined dial memory. For this reason, the number of dial memories can be increased.

In this preferred embodiment, a telephone number corresponding to the displayed dial memory may be transmitted through the line 100 by pressing a transmitting key (not shown).

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An apparatus for referring to a content of a dial memory in a telephone set, comprising:

a dial memory group including a plurality of dial memories, each of said dial memories storing a content of a telephone number and letter data;

an index letter memory storing index letter data arranged in a predetermined order, each of said index letter data being a part of said letter data;

a key input unit including a forward direction reference key for generating a forward direction reference signal and a reverse direction reference key for generating a reverse direction reference signal;

a display for displaying said content stored in each of said dial memories;

whole memory reference means for referring in turn to each of said plurality of dial memories included in said dial memory group in said forward or reverse direction selected by said forward or reverse direction reference key one by one to display said content on said display beginning with a dial memory displayed on said display at a time of generating a signal of a reference instruction as a starting memory;

a skip reference means for referring in turn to index letter data and corresponding dial memories in said forward or reverse direction to display respective contents of said dial memories on said display, each of said dial memories being indexed by each of said index letter data, said skip reference means being operative to display one of said dial memories corresponding to one of said index letter data referenced; and a whole memory reference key and a skip reference key, respectively, provided in said key input unit, said whole memory reference key selecting said whole memory reference means to be driven in a condition that said skip reference means is not selected, while said skip reference key selecting said skip reference means to be driven in a condition that said whole memory reference means is not selected, wherein said skip reference means is responsive to a skip instruction signal from said skip reference key, for skipping a user-designated number n of index letter data before displaying said contents of said dial memories beginning with a start memory, said whole memory reference means being operative in response to said whole memory reference key.

2. An apparatus for referring to a content of a dial memory in a telephone set, according to claim 1, wherein:

said whole memory reference means and said skip reference means are included in a central processing unit which is connected to a transmitting and receiving circuit of said telephone set.

3. An apparatus as defined in claim 1, wherein said index letter data comprises one or more alphanumeric characters.

4. An apparatus for referring to a content of a dial memory in a telephone set, comprising:

a dial memory group including a plurality of dial memories, each of said dial memories storing a content of a telephone number and letter data;

an index letter memory storing index letter data arranged in a predetermined order, each of said index letter data being a part of said letter data;

a key input unit including a forward direction key for generating a forward direction reference signal, a reverse direction reference key for generating a reverse direction reference signal, a skip reference key for generating a skip instruction signal, and a fixing key for generating a fixing signal;

a display for displaying said content stored in each of said dial memories; and means for controlling access of said dial memory group and said index letter memory in accordance with one of said forward and reverse direction reference signals, said skip instruction signal and said fixing signal;

wherein, when accessing said index letter memory in a first mode, said index letter data are output and displayed on said display one by one in accordance with the generation of said forward and reverse direction reference signals, one of said index letter data displayed is fixed on said display when said fixing signal is generated, and the content of at least one dial memory having letter data associated with said index letter data that is fixed is displayed and scrolled according to the further generation of said forward and reverse direction reference signals; and when accessing said index letter memory in a second, skip mode selected in response to generation of said skip instruction signal, a selected index letter data is output in accordance with a user-designated number n of index letter data to be skipped.

5. An apparatus as defined in claim 4, wherein said index letter data comprises one or more alphanumeric characters.

\* \* \* \* \*

UNITED STATES PATENT AND TRADEMARK OFFICE
CERTIFICATE OF CORRECTION

PATENT NO. : 5,483,591
DATED : January 9, 1996
INVENTOR(S) : Noriko KOMA

It is certified that error appears in the above-indentified patent and that said Letters Patent is hereby corrected as shown below:

Col. 4, line 30, delete "arid", insert --and--.

Signed and Sealed this

Ninth Day of July, 1996

Attest:

BRUCE LEHMAN

*Attesting Officer*   Commissioner of Patents and Trademarks